United States Patent [19]

Vital et al.

[11] 3,992,643

[45] Nov. 16, 1976

[54] LOAD CURRENT PULSE CONTROL DEVICES

[76] Inventors: Zoltan Vital, 353, chaussee St. Job, Uccle; Jean Orban, 11, avenue des Mesanges, Clabecq, both of Belgium

[22] Filed: Aug. 17, 1973

[21] Appl. No.: 389,200

Related U.S. Application Data

[62] Division of Ser. No. 275,886, July 27, 1972, Pat. No. 3,818,266, which is a division of Ser. No. 244,279, Apr. 14, 1972, which is a continuation of Ser. No. 799,554, Feb. 13, 1969 abandoned.

[30] Foreign Application Priority Data

| Feb. 13, 1968 | Belgium | 54471 |
| Nov. 21, 1968 | Belgium | 66425 |
| Dec. 27, 1968 | Belgium | 68017 |
| Jan. 20, 1969 | Belgium | 68982 |

[52] U.S. Cl............................... 313/198; 313/201; 313/234; 313/306
[51] Int. Cl.² .......................................... A47B 53/00
[58] Field of Search ........... 313/197, 198, 223, 237, 313/246, 201, 234, 283, 306

[56] References Cited
UNITED STATES PATENTS

| 2,290,526 | 7/1942 | Berkey et al. | 313/246 X |
| 2,919,369 | 12/1959 | Edgerton | 313/198 X |
| 3,229,146 | 1/1966 | Linkroum | 313/306 X |
| 3,390,296 | 6/1968 | Smith | 313/246 X |

*Primary Examiner*—Robert J. Corcoran
*Assistant Examiner*—Lawrence J. Dahl
*Attorney, Agent, or Firm*—Spencer & Kaye

[57] ABSTRACT

A device for controlling the termination of light emission by a flash including means for detecting the light reflected from the subject being illuminated by the flash, integrating means connected to the detecting means for providing a flash termination signal when the total amount of light received by the detecting means reaches a predetermined value, and flash termination means connected to the integrating device and to the flash device for terminating the delivery of electrical energy to the flash device when the signal from the integrating device reaches its predetermined value. The flash termination device is preferably constituted by a novel gas-filled, arc-producing element having identical, unpolarized electrodes and an internal or external triggering electrode.

6 Claims, 23 Drawing Figures

U.S. Patent Nov. 16, 1976 Sheet 1 of 9 3,992,643
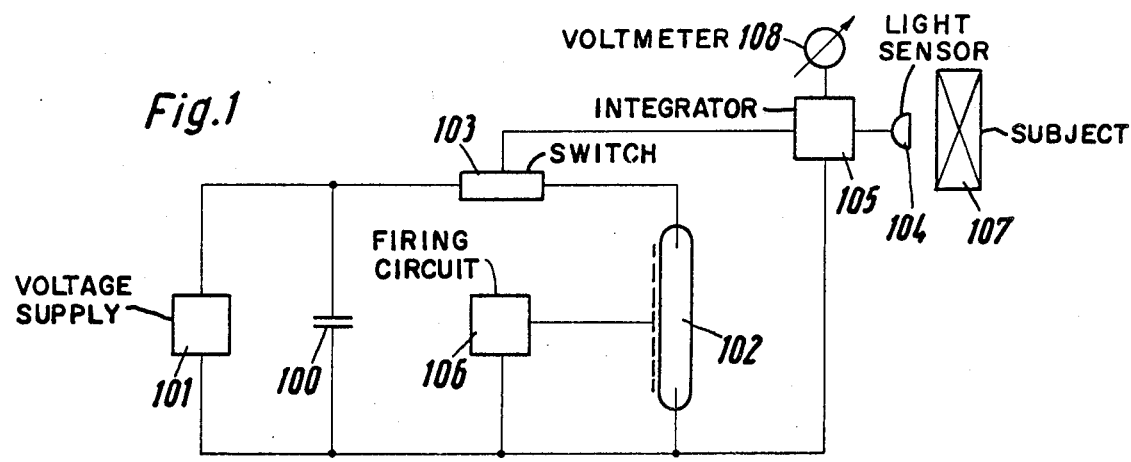
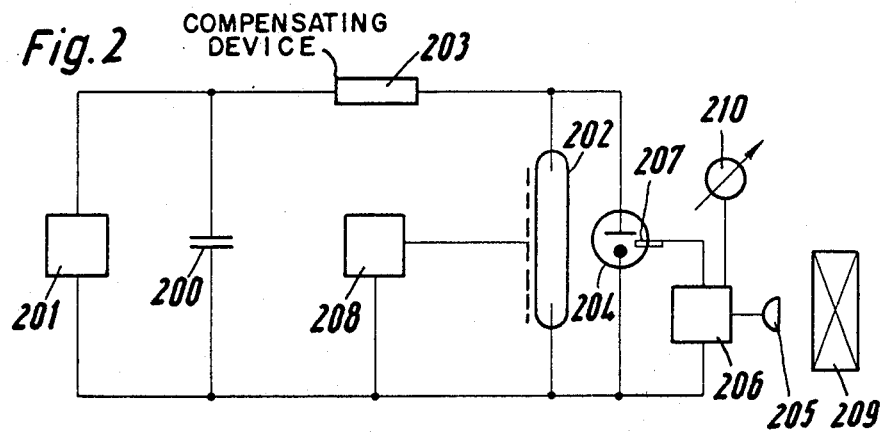
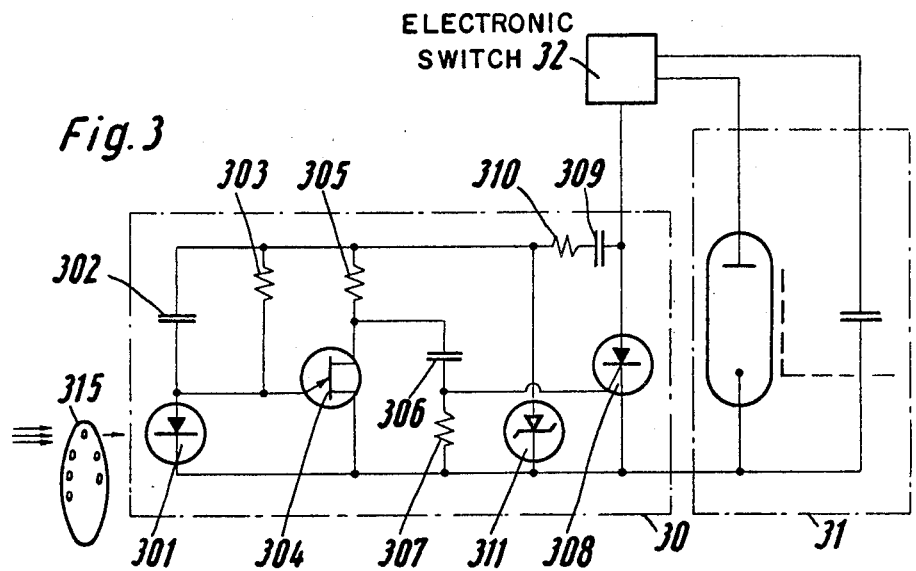

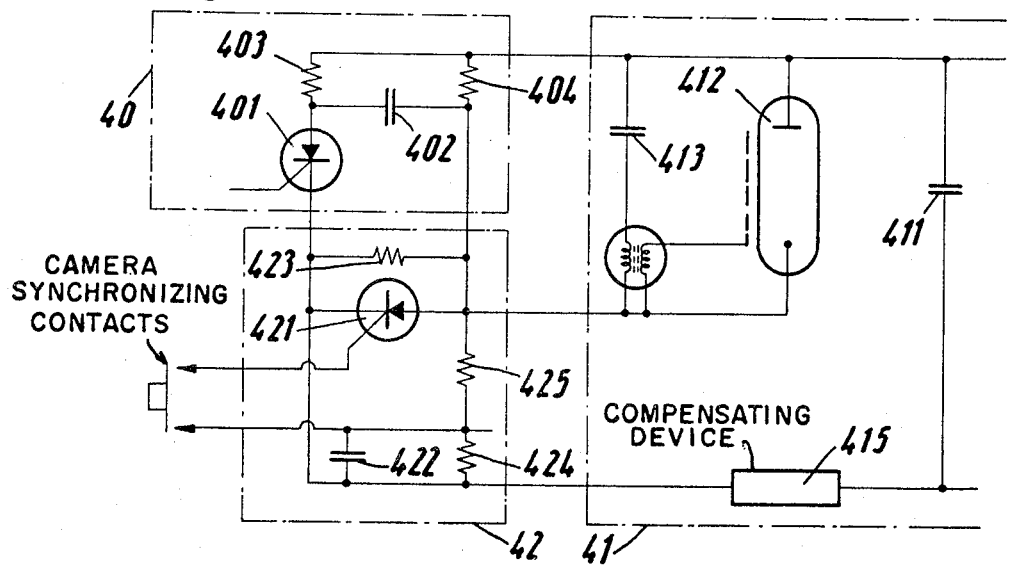
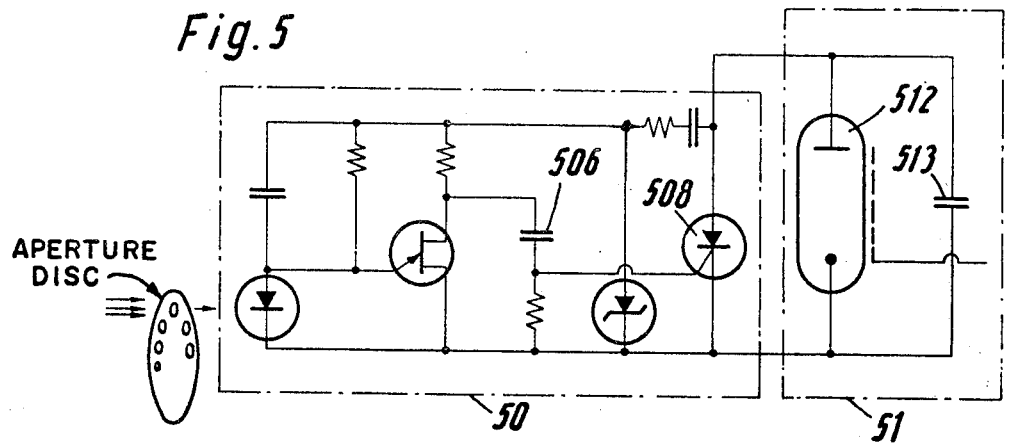
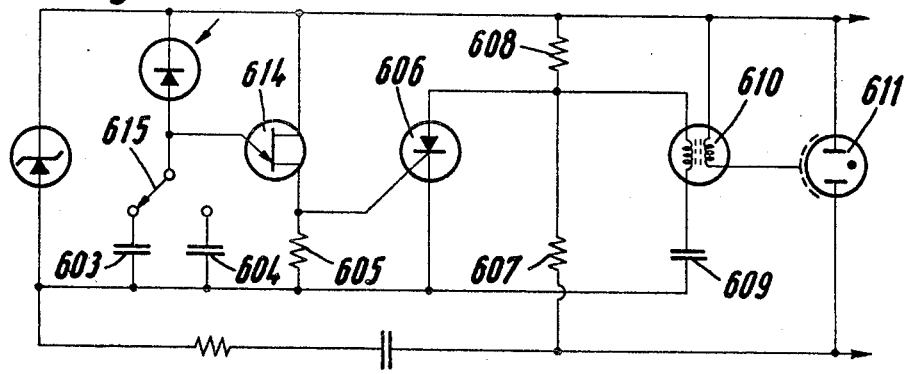

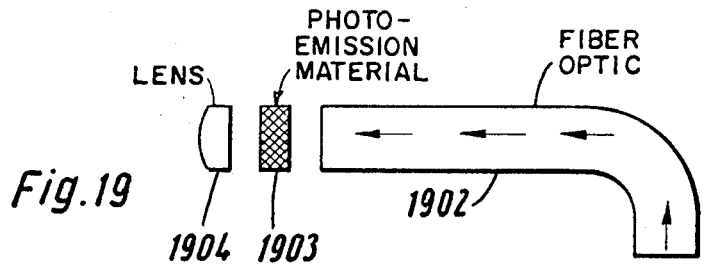
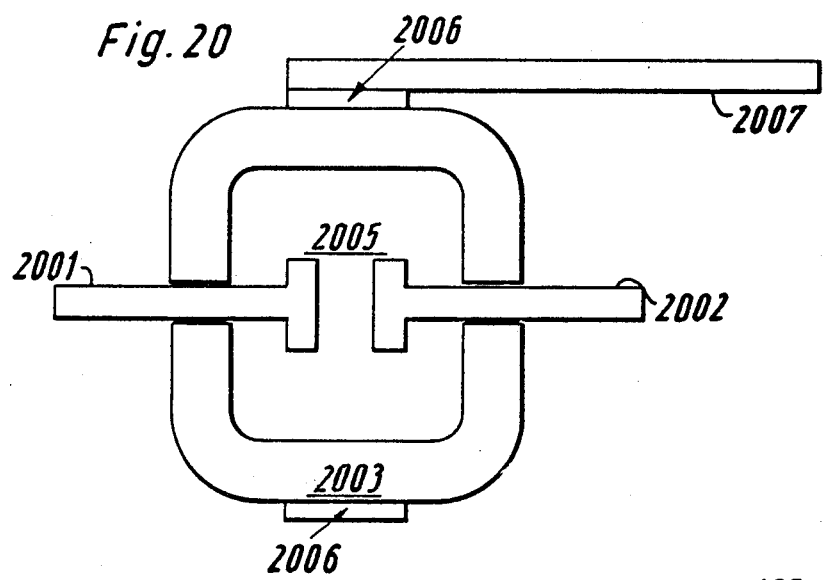
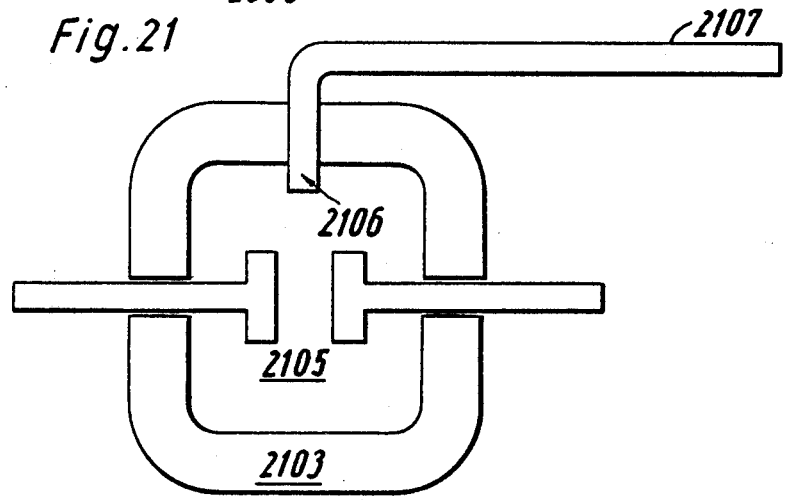

LOAD CURRENT PULSE CONTROL DEVICES

CROSS REFERENCE TO RELATED APPLICATION

This application is a division of application Ser. No. 275,886, filed July 27, 1972, now U.S. Pat. No. 3,818,266 which is a division of application Ser. No. 244,279, filed Apr. 14, 1972 and itself a continuation of application Ser. No. 799,544, filed Feb. 13, 1969 and now abandoned.

BACKGROUND OF THE INVENTION

The invention concerns a device, circuit and method for controlling the impulses generated by the discharge of a capacitor placed either in series or in parallel with the load and, in the case of parallel connection, having no more than one electronic switch. The invention further concerns a novel switching tube for use as such switch and having other uses and equipped with at least one important further device or circuit.

The invention is intended above all for application to electronic flashes, stroboscopes and lasers.

Such devices are now only known for effecting such control in an automatic manner and with the capacitor causing the impulse to bypass the load. Apparatus of such kind is disclosed in U.S. Pat. No. 3,033,988 and is composed of a device which controls the light of a photographic enlarger and in which a gas-discharge switching triode with an external firing electrode or a mercury tube is provided as a second switch, always with an impedance of about 0.1 ohm. Concerning the light sensor of this patent, U.S. Pat. No. 3,350,604 states, at column 3, lines 27–32: "In order to achieve the high photocell dark impedance with the required high light sensitivity, the light sensitive element must be a photomultiplier tube. Such tubes require a rather complex power supply. This results in a package which is sufficiently bulky as to preclude its use in portable, camera mounted flash equipment." Another known device of the same kind is disclosed in U.S. Pat. No. 3,350,604, which is essentially based on the disclosure of U.S. Pat. No. 3,033,988, and represents a modification thereof in that this device makes use of a nonreactive light integrator, i.e. one without a capacitor, and the patent states that the use of this is more advantageous than that of the integrator of U.S. Pat. No. 3,033,988.

These known devices, which can only operate in an automatic manner, i.e. be being coupled permanently to a sensor, always have two or more switches. The switch of the second patent (3,350,604) is a xenon gas-filled discharge tube, a variant of the well-known xenon gas-filled photoflash tube, equipped with an internal firing electrode and having a pressure of about 100 mm Hg. The internal resistance of this tube is mentioned as being 0.1 ohm.

SUMMARY OF THE INVENTION

According to the present invention, an improved control is achieved by a control device serving to arrest the discharge of a capacitor, and thus extinguish the flash tube.

A modified embodiment of the invention involves a control device which is used only to extinguish the flash tube. In this case, we use only one electronic switch or a gas-filled switching tube of new design, which relies on an arc operation and is thus different from the gas discharge tubes of the two U.S. patents discussed above, and which consumes the residual electrical energy of the capacitor, not used by the flashtube, the switch then being in a bypass circuit. In addition, we use at least one important complementary device or circuit, such as a special electronic gate, a device for the regulation of the sensitivity, etc.

BRIEF DESCRIPTION OF THE DRAWINGS

FIG. 1 is a schematic circuit diagram of a control circuit according to the invention.

FIG. 2 is a view similar to that of FIG. 1 of another form of construction of a control device according to the invention.

FIG. 3 is a view similar to that of FIG. 1 of a further control device according to the invention.

FIG. 4 is a view similar to that of FIG. 1 of still another control device according to the invention.

FIG. 5 is a schematic circuit diagram of a modified type of control circuit according to the invention.

FIG. 6. is a view similar to that of FIG. 5 of another embodiment of the modified type of control circuit according to the invention.

FIG. 19 is a pictorial view of a self-regulating to control device according to the invention.

FIG. 20 is an elevational view of one embodiment of a novel arc-operated switch according to the invention.

FIG. 21 is a view similar to that of FIG. 20 of another embodiment of the switch according to the invention.

DESCRIPTION OF THE PREFERRED EMBODIMENTS

Figure 7:
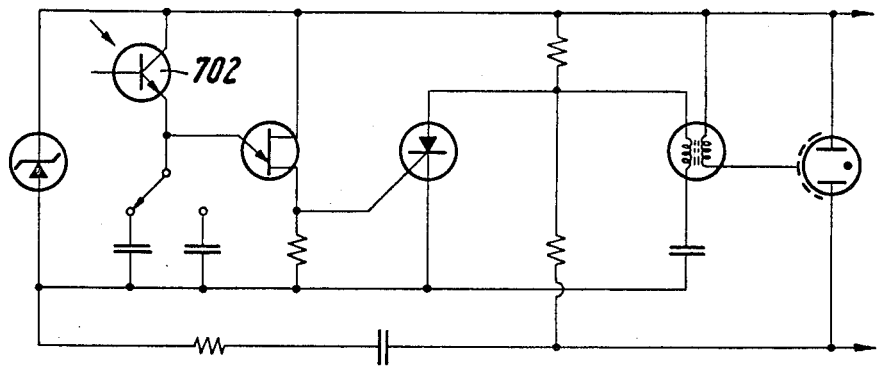
FIG. 7 is a view similar to that of FIG. 5 of a further embodiment of the modified type of control circuit according to the invention.

The invention concerns devices and circuits for controlling impulses generated by the discharge of a capacitor. These impulses are controlled by components placed in series and/or parallel with the load and including an integrator which receives the energy of the impulses. This control device may be operated in a manual and/or an automatic manner. All these devices are combined preferably with several other devices and circuits. The invention is especially related to electronic photoflashes, stroboscopes, lasers and the like, the reflected light of which is to be received by a light sensor whose output signal is to be integrated. When the light sensor has received a predetermined quantity of light, a threshold amplifier consisting of a uni-junction transistor, a four-layer diode or any other suitable component and placed after the integrator generates impulses which control one or several semiconductor switches and/or one or several gas-filled tubes and/or one or several lightning arresters, preferably of the gas-filled type, and/or, most particularly, one or several gas-filled arc arresters of special construction to be described later in a detailed manner, and/or other similar components.

These components control the electrical supply of a flash tube, the impedance of which is higher than that of the switch, with or without arresting the discharge of the photoflash capacitor. Another essential element of this invention is the abovementioned new type of arc arrester component of the gass-filled type, having an impedance of about 0.01 ohm when in its conduction state, fitted with at least two electrodes, preferably unpolarized and even of identical size, and internally or externally completed with a firing electrode. This new type of gas-filled switching tube differs from other gas-filled switching tubes above all because it functions on the basis of an arc and not as a gas-discharge tube of the type used in the prior art. The tube according to the present invention has the following advantages over all other gas-filled tubes, such as those of the two above-cited U.S. patents: lower impedance; larger range of current intensitites and voltages; higher resistance to overloads; easier firing, and this over a more extended range; lower light emission; possibility of utilization at faster switching rates; increased ruggedness; extended lifetime, smaller sizes; and lower cost.

Furthermore, this new component is suitable for use in fields where thyratrons and thyristors are presently used or where no convenient component is available.

We remark that our control device, when using only one electronic switch or the gas-filled, arc-operation tube according to the invention is considerably smaller than all other similar devices, which is of the greatest importance in the case of portable devices.

We describe the supplementary devices and circuits intended to be combined with the control device.

The control device may be completed by one or several electronic gates. The function of the electronic gate is to conduct current from the electric supply of the control device only during the period of the flash discharge. The supply current is initiated by the discharge of a capacitor associated with the electronic gate. This capacitor was previously charged by the photoflash discharge capacitor through a resistive, inductive, semiconductor, or other element. The supply voltage is controlled by a Zener diode, a gas-filled tube, a capacitor, a resistance, or another element.

It is the electronic gate which starts and maintains this control device for the duration of each flash of the photoflash and which sets the control device back to its starting point right after the flash is terminated. Thus, it is not possible for the control device to be actuated by any other source of light.

On the other hand, the control device may be completed with a device that regulates its own sensitivity, namely, by an adjustable optical device, such as a diaphragm, a set of filters, or others, placed in front of the light sensor of the control device, or by an adjustable electric or electronic device, such as fixed and/or variable capacitances, resistances and inductances.

These controls can be operated manually or else by coupling to a part or accessory of the camera, such as to the diaphragm, the film cassette, e.g. a coded Kodapak cassette, etc. Of course, in the case of a control coupled to the camera, both apparatuses should be constructed together.

The regulating components, being designed to be manipulated by the user, are completed with scales graduated in film sensitivities and/or in diaphragm apertures. The selected positions could be ratcheted or locked. The components to be manipulated and the scales are preferably interchangeable and reversible. This same device could be completed by a "focal length-aperture" calculator. This same device and its scales can be lighted.

Another mode of operation consists of controlling the quantity of light produced by the flash tube by a manual regulation of the control device of the integrator, without intervention by a light sensor, o.e. without taking into account the quantity of reflected light, based on the camera-to-subject distance, the film sensitivity, etc. In this case, the light sensor of the control device is replaced by at least one adjustable component, e.g. the setting element of the threshold amplifier of the integrator, etc. The controls of this device may be graduated in distance, flash-duration, guide numbers, etc.

Another control function is a determination of whether the operation of the control device was completed or not. This control consists of a suitable electric or electronic circuit or else a light sensor, such as a photosensitive element, etc., or a conductor of visible or nonvisible light, such as fiber optics, transparent material, etc., or a heat conductor, i.e. responsive to infrared radiation, used in conjunction with a gas-filled switching tube, or with any other component of the control device having the kind of emission as described above.

The control device can be completed with a circuit having an electric or electronic measuring instrument which allows the light integrator to function as a photometer, a chronometer, etc., and thus to execute different measurements, such as the amount of light reflected, the duration of the flash, etc.

A photoflash equipped with a control device may be advantageously completed with a compensation device, e.g. an induction coil and/or a suitable circuit, connected in series with the flash tube to modify the discharge impulses to the flash tube, for instance to slow down the discharge of the capacitor, which means to reduce the rate of increase of the current density of the capacitor discharge. FIG. 1 shows the circuit of an electronic photoflash equipped with a control device having only one switch whose purpose is to arrest the capacitor discharge when a predetermined amount of light has been produced.

The arrangement of such a unit is as follows:

An energy storage capacitor 100 is charged through a voltage source 101. A flash tube 102 of the usual type is connected to the capacitor terminals through a switch 103 which is preferably a gate-turn-over thyristor or thyratron, etc., provided, if necessary, with suitable supplementary circuitry. A light sensor 104, composed of a photodiode, phototransistor, photoresistance, or other, is connected to an integrating circuit 105 of any well-known type. A firing circuit 106 triggers the firing to the flash tube 102. This device works as follows:

The capacitor 100 having been charged by the source 101, the ionization of the flash tube 102 is induced by the action of the firing circuit 106. The light sensor 104 supplying an instantaneous current proportional to the illumination on subject 107, to the integrating circuit 105, the latter, when the total amount of light received by the light sensor 104 reaches a predetermined value, causes a circuit to "swing", thus supplying an impulse to the switch 103 which then interrupts the discharge of the capacitor 100.

Thus, the light emission of the flash tube is arrested after producing the requisite amount of light, without any energy being withdrawn from the capacitor other than that used for producing the light, and possibly for commutating the circuit.

The arrangement of FIG. 1 may be completed in the following manner: by connecting a voltmeter 108 to the terminals of the integrator circuit 105, which is designed for such a connection, an integrating photometer, or chronometer, can be produced, which device has scales in different measuring units.

Another variant is illustrated in FIG. 2 in which we describe a control device connected both in series and parallel with the load and combined with a compensating device, capable of also being used with the preceding embodiment, constituted by an induction coil.

The discharge capacitor 200 is charged through the voltage source 201. The flash tube 202 is connected to the terminals of the capacitor 200 through the intermediary of the induction coil 203. A thyratron 204 is connected in parallel with the flash tube 202. A light sensor 205 is coupled to the integrating circuit 206, receives reflected light from subject 209 and controls the firing electrode 207 of the thyratron 204. A firing circuit 208 acts to fire the flash tube 202. Meter 210 is connected to circuit 206.

The operation of the circuit of FIG. 2 differs from that of FIG. 1 as follows:

After reaching the predetermined signal value, the circuit of the integrator 206 triggers the firing electrode 207 of the thyratron 204 in parallel with the flash tube 202. The induction coil 203 allows for a short period during which the thyratron is practically in short-circuit. Consequently, the flash tube 202 has enough time to deionize, and hence to become extinguished.

A modification is illustrated in FIG. 3. This control device is combined with both an electronic gate and an optical device of regulation of the sensitivity.

The control device consists of an electronic device 30 which is identical with the device 50 of FIG. 5, of the photoflash unit 31 and of an electronic switch 32.

In this device, a light sensor 301 generates a current proportional to the reflected light from the subject. This current is integrated by a capacitor 302 to give a voltage proportional to the amount of the reflected light. This voltage is applied to a unijunction transistor 304 or to a four-layer diode or to some other element or device which would serve as suitable substitute, which develops a positive impulse in the resistance 305 as soon as the threshold "swing" or switching level, of this component 304 has been reached.

This impulse is conducted by the capacitor 306 to open a semiconductor switch, or other gate element, 308 by means of its firing circuit which controls the electronic switch 32 so as to terminate the capacitor discharge and thereby extinguish the flash tube of the photoflash 31.

As soon as the cycle is ended, the voltage across a resistance 303 sets the system back to its initial condition. A resistance 307 prevents a premature opening of the semiconductor switch 308. The unit 31 contains the elements of the photoflash which are not individually referenced. The electronic device 30 contains as its principal element a semiconductor switch, such as a thyristor (SCR), or else a gas-filled switching tube, preferably of the arc arrester type or a special arc arrester, or another suitable component.

An improvement of the flash control device consists in equipping this device with a voltage applying circuit for the reflected light sensor circuit.

FIG. 3 also illustrates this circuit arrangement. When the flash tube is fired, the voltage at the flash tube terminals decreases sharply. This results in a current in the circuit of the capacitor 309, the resistance 310 and the diode 311. A voltage equal to that across the zener diode appears at the terminals of the light sensor circuit so as to place it in operation. The current intensity depends on the resistance value of resistor 310. The period during which operating voltage is applied to the light sensor circuit depends on the value of the capacitor 309.

The regulation of the sensitivity of the control device is effected by the user with the help of an adjustable optical device 315 composed of a diaphragm, a set of filters, or others, placed in front of the light sensor 301 of the control device.

A further explanation is given with reference to FIG. 4 which shows a light control device for the flash of an electronic photoflash, consisting of the electronic device 40, which is similar to the device 30 of FIG. 3 and the device 50 of FIG. 5 and which is therefore only partially shown, of the photoflash 41, which is similar to the device 31, and of an electronic switch 42, which is similar to the device 32, connected in series with the flash tube circuit.

This device and its operation are essentially identical to those described and illustrated previously, namely:

The thyristor 421, which is fired upon closing of the camera synchronization contacts, applied the voltage of the discharge capacitor 411 across the flash tube 412, the latter having received previously a fraction of this voltage, the value of which fraction is determined by the resistances 404 and 423, and to the tube firing circuit consisting of a capacitor 413 and a transformer 414, thus firing the flash. When the thyristor 401 becomes conductive due to the subject having been sufficiently illuminated, it discharges the capacitor 402, which was previously charged, into the thyristor 421, which results in reversing the anode voltage of the thyristor for a short period so as to cause it to block and thus arrest the discharge of the capacitor 411. The capacitance value of the capacitor 402 is selected so as to obtain an impulse of sufficient duration to allow the extinction, or blocking, of the thyristor 421. The capacitance value of the capacitor 422 is selected so as to obtain the shortest possible impulse so that the extinction of the thyristor 421 may occur as rapidly as possible. The resistances 424 and 425 are used to polarize the capacitor 422. The value of resistance 403 must be selected in order to give a current lower than the maintenance current of the thyristor 401 so as to prevent the capacitor 411 from continuing to discharge itself through the thyristor 401. A compensation device, such as an induction coil, 415 modifies the discharge impulse in the flash tube. Among other things, it lengthens the discharge duration, etc.

FIG. 5 shows a control device combined with an electronic gate and with an optical device for the regulation of sensitivity. This control device consists of an electronic device 50 and the photoflash 51.

The componenets and operation of this device are identical to those described with reference to FIG. 3, with the difference that an impulse transmitted by the capacitor 506 opens a semi-conductor switch, or a special arc arrester, etc., 508, via its firing circuit and thereby extinguishes the flash tube 512 of the photoflash while discharging the capacitor 513 of the latter.

In FIG. 6, we describe another embodiment equipped with a special arc arrester combined with an electronic gate and with an electric device having several capacitors for the regulation of sensitivity. A special arc arrester 611 and its firing device, whch consists of the thyristor 606, the resistances 607 and 608, the capacitor 609 and the transformer 610, serve as a substitute for the thyristor 508 of FIG. 5. Here, we make use of an electric circuit for adjusting the sensitivity, the circuit consisting of a switch 615 connected to select one of the capacitors 603 and 604 having different capacitance values.

Figure 8:
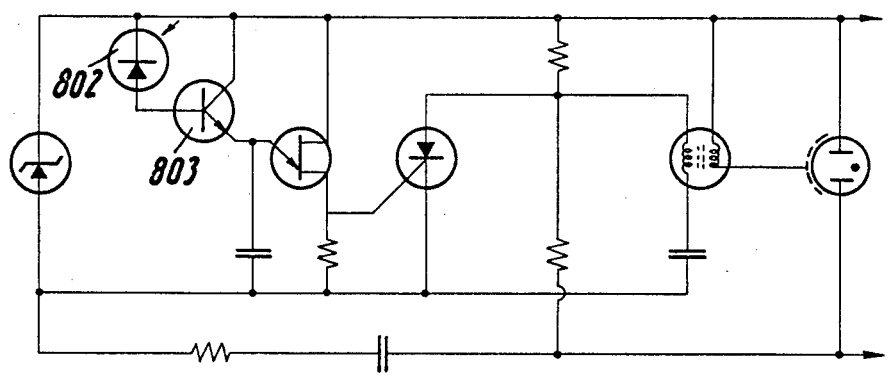
FIG. 8 is a view similar to that of FIG. 5 of still another embodiment of the modified type of control circuit according to the invention.

In FIG. 7 there is shown another embodiment in which the photodiode is replaced by a phototransistor 702 in order to give a higher sensitivity to the light integrator than is possible with the photodiode. In FIG. 8 the photodiode 802 has an amplification circuit composed essentially of an npn transistor 803 which allows the selection of a very high sensitivity, as a function of the gain of the transistor.

Figure 9:
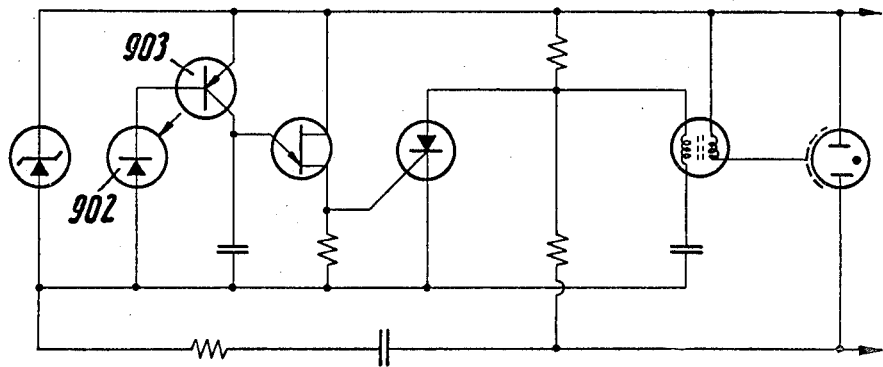
FIG. 9 is a view similar to that of FIG. 5 of a still further embodiment of the modified type of control circuit according to the invention.

In FIG. 9 a pnp transistor 903 replaces the npn transistor.

Figure 10:
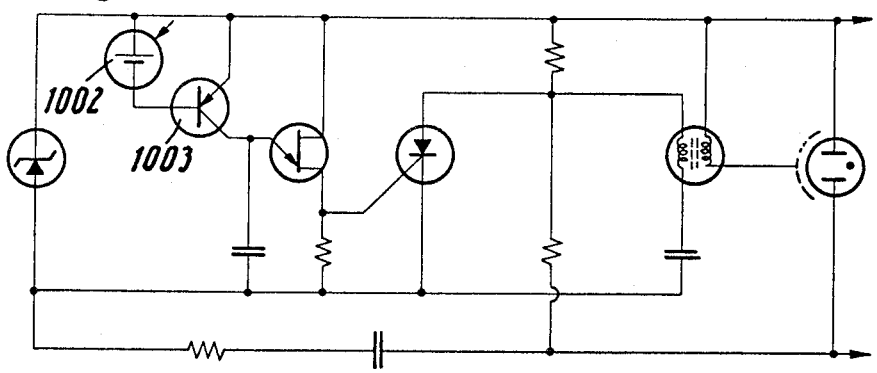
FIG. 10 is a view similar to that of FIG. 5 of yet another embodiment of the modified type of control circuit according to the invention.

In FIG. 10 the light sensor is photovoltaic cell, such as a solar cell, etc., 1002, the current of which is amplified by a transistor 1003.

Figure 11:
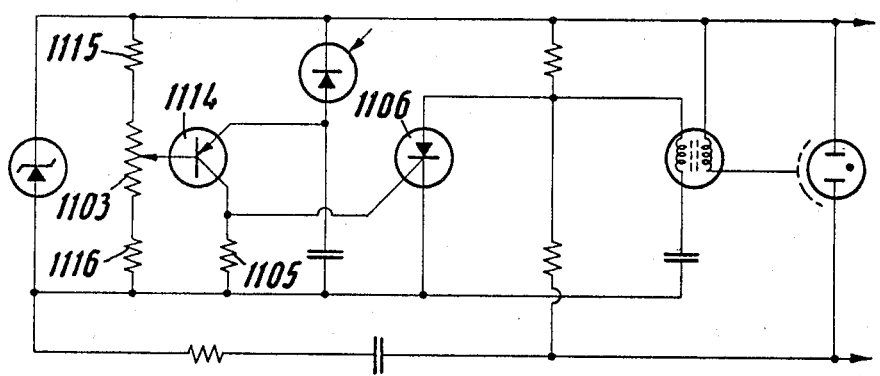
FIG. 11 is a view similar to that of FIG. 5 of yet a further embodiment of the modified type of control circuit according to the invention.

In FIG. 11 the firing of the thyristor 1106 is effected by a threshold amplifier which consists of the transistor 1114 and the resistances 1103, 1105, 1115 and 1116. The switching threshold may be adjusted or regulated internally and/or externally my means of the resistance 1103. The threshold voltage determines the control device sensitivity.

Figure 12:
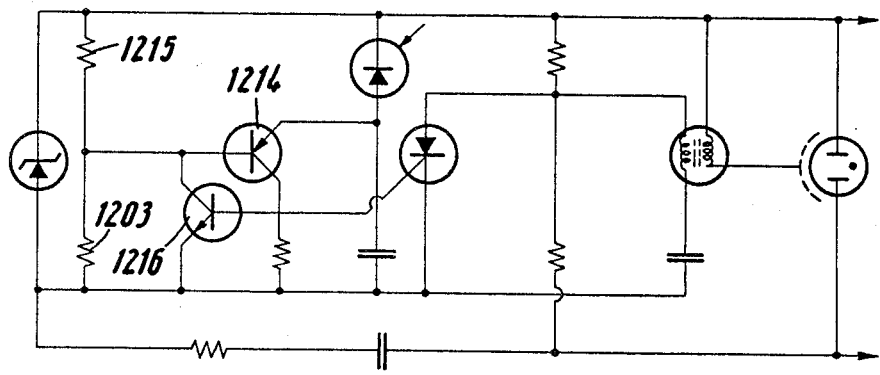
FIG. 12 is a view similar to that of FIG. 5 of a further embodiment of the modified type of control device according to the invention.

In FIG. 12 the threshold amplifier contains two transistors 1214 and 1216. The switching threshold may be adjusted by selecting suitable values for the resistances 1215 and 1203.

Figure 13:
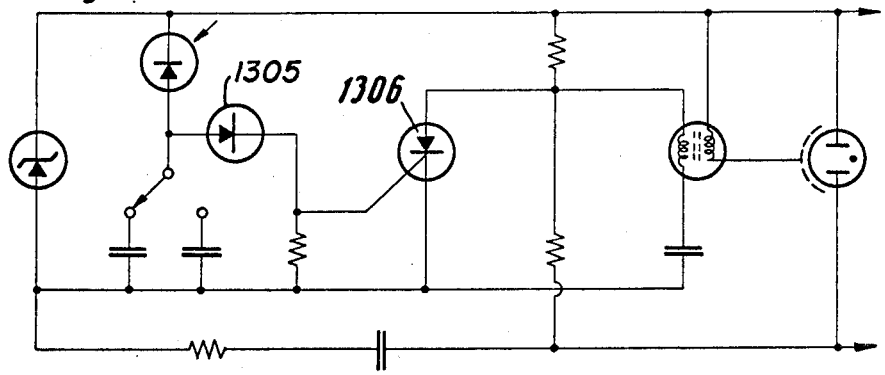
FIG. 13 is a view similar to that of FIG. 5 of another embodiment of the modified type of control device according to the invention.

In FIG. 13 we use a circuit with a four-layer diode constituting a unilateral, bilateral switch, etc. as the level detector and at the same time as the firing impulse generator for the thyristor 1306.

Figure 14:
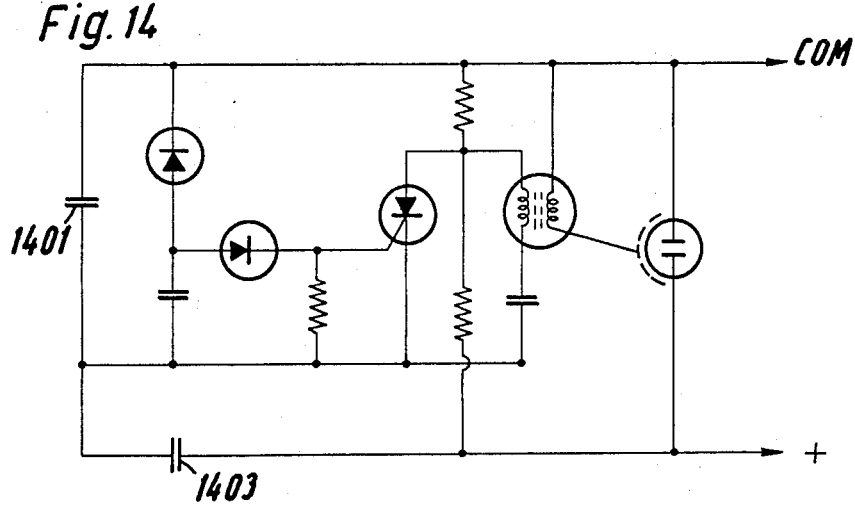
FIG. 14 is a view similar to that of FIG. 5 of a further embodiment of the modified type of control device according to the invention.

In FIG. 14 the control device contains a voltage divider circuit which consists of the capacitors 1401 and 1403 instead of a zener diode, a capacitor and a resistance as in the previous arrangements.

Figure 15:
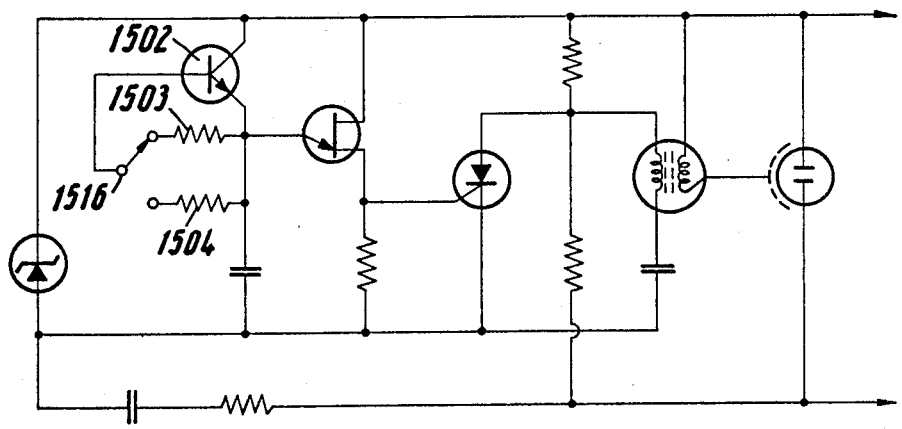
FIG. 15 is a view similar to that of FIG. 5 of a further embodiment of the modified type of control device according to the invention.

In FIG. 15 the control circuit contains a phototransistor 1502 and an electric device for regulating the sensitivity. The latter device consists of a switch 1516 which permits a selection of either one of the resistances 1503 and 1504, the value of the resistance selected determining the effective sensitivity of phototransistor 1502 and, therefore, the device sensitivity.

Figure 16:
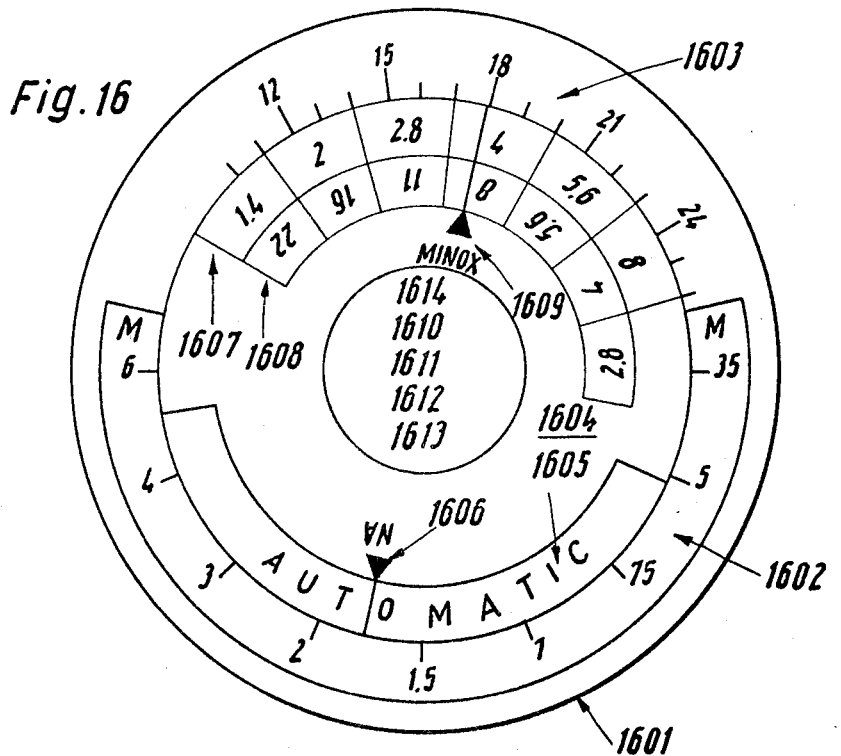
FIG. 16 is an elevational view of a manually adjustable setting unit for use with control circuits according to the invention.

In FIG. 16 there is shown a scale device intended for permitting an external regulation of the sensitivity, i.e. related to focal distance, or range, and/or diaphragm apertures. Moreover, we have combined this device with the usual "focal distance — aperture" calculator of electronic photoflashes and with other improvements as well. This regulating device consists of a fixed interchangeable disc 1601 and a rotatable and self-locking disc 1604 coupled to the device for regulating the sensitivity of the control device.

Graduated in degrees DIN, scale 1603 on disc 1601 is provided for setting the film sensitivity, and graduated in meters, scale 1602 is provided for setting distances. In the case of a photographic camera fitted with an adjustable diaphragm, the disc 1604 is to be rotated so as to bring the desired aperture indication on scale 1607 right opposite the sensitivity figure on scale 1603 for the film being utilized. The zone 1605 of disc 1604 shows on scale 1602 the range of distances for which the control device will work accurately.

Another way of using this same device is to select the focal distance, or range, and read the aperture to be used opposite the sensitivity figure for the film being used.

For use with a photographic camera fitted with a fixed diaphragm, as for example the "Minox" camera with a 3.5 aperture, the disc 1604 is rotated so as to bring the "Minox" pointer 1609 opposite the sensitivity for the film being used on scale 1603. The zone 1605 of the disc 1604 shows on scale 1602 the range of distances for which the control device can work accurately.

If the control device is not to be used, one must rotate the disc 1604 so as to bring the "NA" pointer (="nonautomatic") 1606 opposite the sensitivity figure of the film used on scale 1603.

The scales 1608 and 1602 are used in the same manner as those of a customary "distance — aperture" calculator. This operation results in setting the control device sensitivity to the starting, or zero point, which means that it is out of action.

This device may advantageously be combined with a light source 1610 which allows easier use and reading.

The same device may also be combined with the following luminous indicators:
for the charge of the photoflash capacitor 1611;
for the control device, to indicate whether it functions or not, (functioning 1612, not functioning 1613);
for the achievement of the functioning of the control device 1614.

Figure 17:
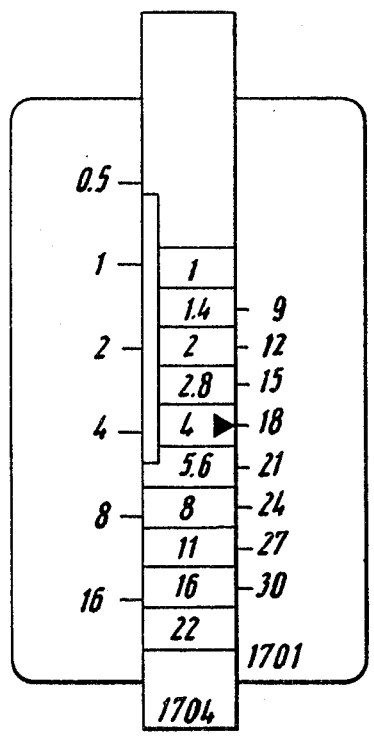
FIG. 17 is an elevational view of another embodiment of the unit of FIG. 16.

FIG. 17 shows essentially the same device as FIG. 16, but the device of FIG. 17 is in the shape of a fixed and interchangeable guide strip 1701 and a sliding and self-locking slider 1704.

Figure 18:
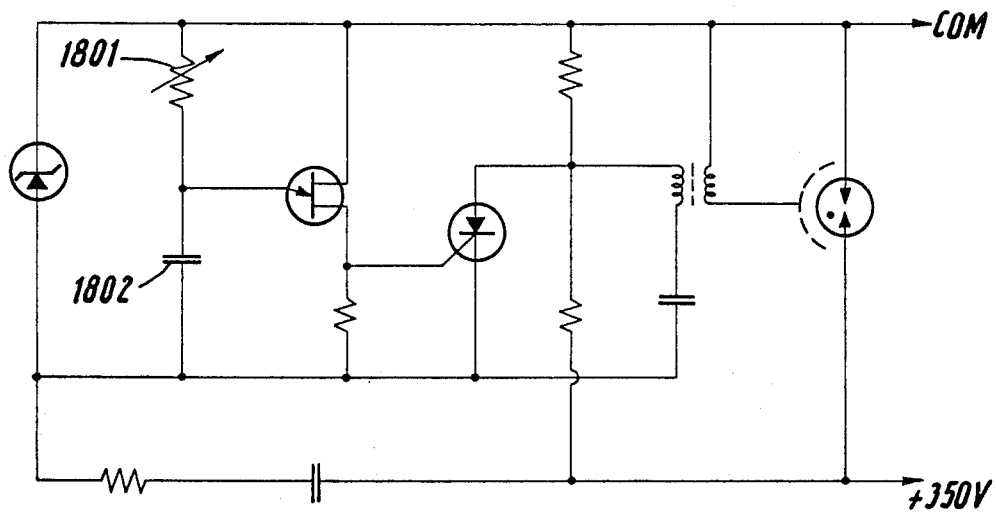
FIG. 18 is a view similar to that of FIG. 5 of a still further embodiment of the modified type of control circuit according to the invention.

In FIG. 18 there is shown a control device which is fundamentally identical to that of FIG. 15, but equipped for manual regulation. In this case, the light sensor is replaced by a variable resistance 1801 whose setting determines the period required for the capacitor 1802 of the integrator to reach its triggering charge.

In FIG. 19 there is shown an optical control and indicator device for operating the control device. This optical device consists of a fiber-optic element 1902 one end of which is placed on the special arc arrester 1901 which emits light when actuated. The other end of the fiber optic is covered with a fluorescent, luminescent, or phosphorescent material 1903, or else the fiber optic touches a part of the photoflash which is covered with such a material, and in both cases, it is set in a place easily viewed by the user, such as in or on the sensitivity regulation scale unit.

Possibly, a complementary optical system 1904 can be used to further increase the visibility of this indicator.

In FIG. 20 there is shown one embodiment of the abovementioned special gas-filled tube of the arc arrester type. This consists of an electrically isolating enclosure 2003, which can be transparent, translucent or opaque, whose interior 2005 is filled with a gas, preferably argon and contains two preferably identical and unpolarized electrodes 2001 and 2002. A third firing electrode 2006 is arranged outside the enclosure 2003 and is extended by the connecting wire 2007. The electrodes 2001 and 2002 are located and formed in such a way, and the filling and the pressure of the gas are chosen in such a manner, that this tube will function to perform an arc operation. The modified embodiment of FIG. 21 has a firing electrode 2106 which protrudes into the gas-filled interior 2105 of the enclosure 2103.

Figure 20A:
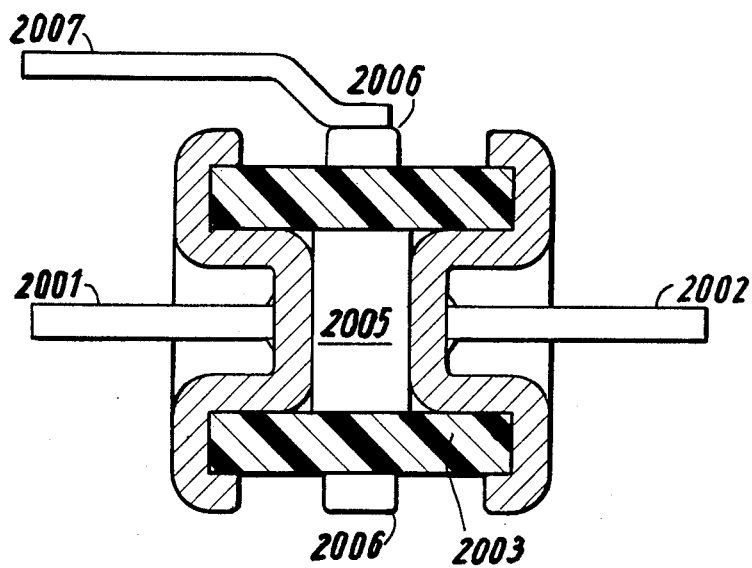
FIG. 20a is a cross-sectional view of the embodiment of FIG. 20.
Figure 21A:
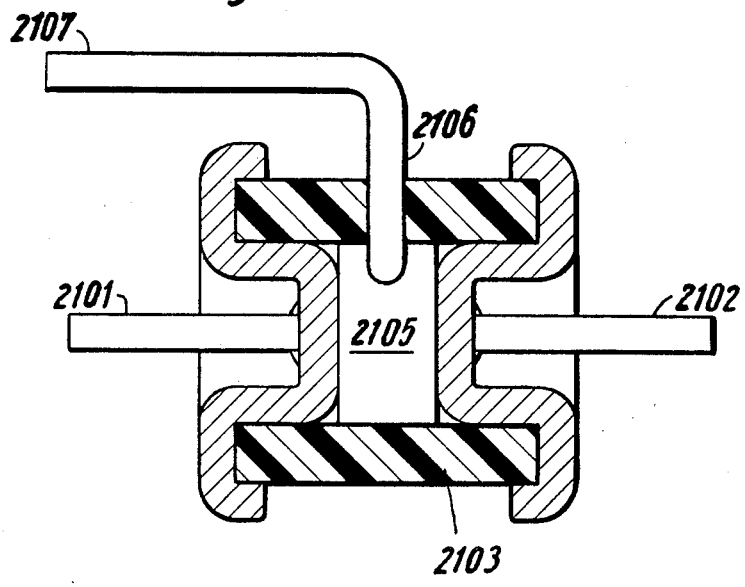
FIG. 21a is a cross-sectional view of the embodiment of FIG. 21.

As can be seen from FIGS. 20a and 21a, which show modified embodiments of the devices of FIGS. 20 and 21, the enclosures 2003 and 2103 are formed in the shape of tubes and are delimited by two electrodes of the "socket" type, and of large surface area. The length of this tube is about the same as its diameter.

It will be understood that the above description of the present invention is susceptible to various modifications, changes and adaptations, and the same are intended to be comprehended within the meaning and range of equivalents of the appended claims.

We claim:

1. A gas-filled switching tube for use with a photographic flash tube of an electronic flash device for providing a low impedance current path to enable control of current flow through the flash tube, comprising a hollow enclosure having a length substantially the same as the width thereof, two unpolarized main electrodes disposed within the enclosure along with a mass of gas filling the enclosure, the gas and its pressure and the location and form of the electrodes permitting an arc discharge current to flow between, and completely outside said electrodes, firing electrode means disposed around the exterior wall of said enclosure for triggering the flow of such arc discharge current between said main electrodes, and said main electrodes comprising a pair of electrodes forming opposed large electrode surfaces within said enclosure, the spacing between said surfaces being smaller than the spacing across the internal surface of said enclosure.

2. A gas-filled switching tube for use with a photographic flash tube of an electronic flash device for providing a low impedance current path to enable control of current flow through the flash tube, comprising a hollow enclosure having a length substantially the same as the width thereof, two unpolarized main electrodes disposed within the enclosure along with a mass of gas filling the enclosure, the gas and its pressure and the location and form of the electrodes permitting an arc discharge current to flow between said electrodes, firing electrode means disposed around the exterior wall of, and completely outside said enclosure for triggering the flow of such arc discharge current between said main electrodes, and said main electrodes comprising a pair of cup-shaped electrodes forming opposed large electrode surfaces within said enclosure, the spacing between said surfaces being smaller than the spacing across the internal surface of said enclosure.

3. A gas-filled switching tube for use with a photographic flash tube of an electronic flash device for providing a low impendance current path to enable turn-off of the flash tube, comprising a hollow substantially cylindrical enclosure having a length substantially the same as the diameter thereof, two unpolarized main electrodes disposed within the enclosure along with a mass of gas filling the enclosure, the gas and its pressure and the location and form of the electrodes permitting an arc discharge current to flow between said electrodes, firing electrode means disposed around the exterior wall of, and completely outside, said enclosure, to be isolated by said enclosure from the gas filling said enclosure for triggering the flow of such arc discharge current between said main electrodes, and said main electrodes comprising a pair of electrodes coupled with the respective ends of said enclosure and having portions extending into said enclosure forming opposed electrode surfaces within said enclosure, the spacing between said surfaces being smaller than the spacing across the internal surface of said enclosure.

4. A gas-filled switching tube for use with a photographic flash tube of an electronic flash device for providing a low impedance current path to enable turn-off of the flash tube, comprising a hollow substantially cylindrical enclosure having a length substantially the same as the diameter thereof, two unpolarized main electrodes disposed within the enclosure along with a mass of gas filling the enclosure, the gas and its pressure and the location and form of the electrodes permitting an arc discharge current to flow between said electrodes, firing electrode means disposed around the exterior wall of, and completely outside said enclosure for triggering the flow of such arc discharge current between said main electrodes, and said main electrodes being connected and sealed with the respective ends of said enclosure and having opposed electrode surfaces disposed within said enclosure, the spacing between said surfaces being smaller than the spacing across the internal surface of said enclosure.

5. A gas-filled switching tube for use with a photographic flash tube of an electronic flash device for providing a low impedance current path to enable turn-off of the flash tube, comprising a hollow enclosure of substantially cylindrical shape and having a length substantially the same as the external diameter thereof, two unpolarized main electrodes disposed within the enclosure along with a mass of gas filling the enclosure, the gas and its pressure and the location and form of the electrodes permitting an arc discharge current to flow between said electrodes, a firing electrode in the form of a band disposed around the exterior wall of, and completely outside said enclosure for triggering the flow of such arc discharge current between said main electrodes, and said main electrodes comprising a substantially identical pair of cup-shaped electrodes engaging the respective ends of said enclosure and having portions extending into said enclosure forming opposed large electrode surfaces within said enclosure, the spacing between said surfaces being smaller than the spacing across the internal surface of said enclosure.

6. A gas-filled switching tube for use with a photographic flash tube of an electronic flash device for providing a low impedance current path to enable turn-off of the flash tube, comprising a hollow cylindrical enclosure having a length substantially the same as the diameter thereof, two unpolarized main electrodes disposed within the enclosure along with a mass of gas filling the enclosure, the gas and its pressure and the location and form of the electrodes permitting an arc discharge current to flow between said electrodes, firing electrode means disposed around the exterior wall of, and completely outside said enclosure for triggering the flow of such arc discharge current between said main electrodes, and said main electrodes comprising a substantially identical pair of cup-shaped sockets engaging the respective ends of such enclosure and forming opposed electrode surfaces within said enclosure, the spacing between said surfaces being smaller than the space across the internal surface of said enclosure.

* * * * *

UNITED STATES PATENT AND TRADEMARK OFFICE
CERTIFICATE OF CORRECTION

PATENT NO. : 3,992,643
DATED : November 16th, 1976
INVENTOR(S) : Zoltan Vital et al It is certified that error appears in the above–identified patent and that said Letters Patent are hereby corrected as shown below:

In the heading of the patent, under [73] Assignee, insert

--Ponder & Best, Inc., Los Angeles, Calif. --.

Signed and Sealed this ninth Day of August 1977

[SEAL]

Attest:

RUTH C. MASON
Attesting Officer

C. MARSHALL DANN
Commissioner of Patents and Trademarks